US012767899B2

(12) United States Patent
Coady et al.

(10) Patent No.: US 12,767,899 B2
(45) Date of Patent: Oct. 20, 2026

(54) USE OF TRANSITION METAL DOPED NANOPARTICLES AND SILICA NANOPARTICLES FOR $H_2S$ REMOVAL

(71) Applicant: NISSAN CHEMICAL AMERICA CORPORATION, Houston, TX (US)

(72) Inventors: Clive Coady, Geneva, IL (US); Samuel James Maguire-Boyle, Spring, TX (US); John Edmond Southwell, Glen Ellyn, IL (US)

(73) Assignee: Nissan Chemical America Corporation, Houston, TX (US)

( * ) Notice: Subject to any disclaimer, the term of this patent is extended or adjusted under 35 U.S.C. 154(b) by 534 days.

(21) Appl. No.: 18/546,662

(22) PCT Filed: Feb. 18, 2022

(86) PCT No.: PCT/US2022/016952

§ 371 (c)(1),
(2) Date: Aug. 16, 2023

(87) PCT Pub. No.: WO2022/178236

PCT Pub. Date: Aug. 25, 2022

(65) Prior Publication Data

US 2024/0384183 A1 Nov. 21, 2024

Related U.S. Application Data

(60) Provisional application No. 63/151,245, filed on Feb. 19, 2021.

(51) Int. Cl.

| | |
|---|---|
| ***C10G 29/16*** | (2006.01) |
| ***B01D 53/02*** | (2006.01) |
| ***C01B 32/50*** | (2017.01) |
| ***C02F 1/68*** | (2023.01) |
| ***C02F 101/10*** | (2006.01) |
| ***C02F 103/34*** | (2006.01) |
| ***C10L 3/10*** | (2006.01) |

(52) U.S. Cl.

CPC ............. *C10G 29/16* (2013.01); *B01D 53/02* (2013.01); *C01B 32/50* (2017.08); *C02F 1/683* (2013.01); *C10L 3/103* (2013.01); *B01D 2253/1122* (2013.01); *B01D 2253/25* (2013.01); *B01D 2257/304* (2013.01); *C02F 2101/101* (2013.01); *C02F 2103/34* (2013.01); *C10G 2300/207* (2013.01)

(58) Field of Classification Search

CPC ............. C10G 29/16; C10G 2300/207; C10G 25/003; C10G 29/04; B01D 53/02; B01D 2253/1122; B01D 2253/25; B01D 2257/304; B01D 53/80; B01D 2252/20415; B01D 2252/20436; B01D 2253/104; B01D 2253/106; B01D 2253/304; B01D 2255/2073; B01D 2255/20738; B01D 2255/20761; B01D 2255/20792; B01D 2256/24; B01D 53/52; C01B 32/50; C02F 1/683; C02F 2101/101; C02F 2103/34; C10L 3/103; C10L 2290/141; C10L 2290/545

See application file for complete search history.

(56) References Cited

U.S. PATENT DOCUMENTS

| | | | |
|---|---|---|---|
| 1,991,765 | A | 2/1935 | Marks |
| 2,606,873 | A | 8/1952 | Cardwell et al. |
| 3,514,410 | A | 5/1970 | Engle et al. |
| 3,585,069 | A | 6/1971 | Owsley |
| 3,669,613 | A | 6/1972 | Knox et al. |
| 4,220,500 | A | 9/1980 | Baba et al. |
| 4,289,639 | A | 9/1981 | Buske |
| 4,310,435 | A | 1/1982 | Frenier |
| 4,680,127 | A | 7/1987 | Edmondson |
| 4,808,765 | A | 2/1989 | Pearce et al. |
| 4,978,512 | A | 12/1990 | Dillon et al. |
| 5,085,842 | A | 2/1992 | Porz et al. |
| 5,208,369 | A | 5/1993 | Crump et al. |
| 5,980,845 | A | 11/1999 | Cherry |
| 7,141,518 | B2 | 11/2006 | Macdonald et al. |
| 7,438,875 | B2 | 10/2008 | Do et al. |
| 7,985,881 | B2 | 7/2011 | Westlund et al. |

(Continued)

FOREIGN PATENT DOCUMENTS

| | | | |
|---|---|---|---|
| CA | 2769060 | A1 | 8/2013 |
| CN | 101591555 | B | 7/2012 |

(Continued)

OTHER PUBLICATIONS

Amit Singh et al., Copper Coated Silica Nanoparticles for Odor Removal, Sep. 26, 2010, 26(20), American Chemical Society, pp. 15837-15844.

(Continued)

*Primary Examiner* — Anthony J Zimmer
*Assistant Examiner* — Syed T Iqbal
(74) *Attorney, Agent, or Firm* — Nixon & Vanderhye, PC

(57) ABSTRACT

A process to remove $H_2S$ from a stream comprising the steps of adding a dispersion of colloidal nanoparticles having surface functionality comprising Copper, Zinc, Iron, or Manganese, and a triazine. The stream is selected from the group consisting of Oil streams, Gas streams, $CO_2$ point source purification streams, and Geothermal Energy System streams.

4 Claims, No Drawings

(56) References Cited

U.S. PATENT DOCUMENTS

| | | | | |
|---|---|---|---|---|
| 9,006,508 | B2 | 4/2015 | Kanazirev et al. | |
| 9,463,989 | B2 | 10/2016 | Menendez et al. | |
| 11,059,079 | B1 | 7/2021 | Allred, Jr. | |
| 11,077,474 | B1 | 8/2021 | Allred, Jr. | |
| 11,512,241 | B2 | 11/2022 | Allred, Jr. | |
| 11,732,181 | B2 | 8/2023 | Allred, Jr. | |
| 12,275,891 | B2 | 4/2025 | Allred, Jr. | |
| 2005/0084438 | A1* | 4/2005 | Do | B01J 20/28057 423/244.02 |
| 2005/0085144 | A1 | 4/2005 | Macdonald et al. | |
| 2009/0065445 | A1 | 3/2009 | Westlund et al. | |
| 2011/0000854 | A1 | 1/2011 | Nichols et al. | |
| 2013/0004393 | A1 | 1/2013 | Menendez et al. | |
| 2013/0204065 | A1 | 8/2013 | Kanazirev et al. | |
| 2014/0155669 | A1 | 6/2014 | Slowing et al. | |
| 2016/0237335 | A1 | 8/2016 | Salla et al. | |
| 2018/0044598 | A1 | 2/2018 | Tan | |
| 2018/0291284 | A1* | 10/2018 | Sommese | B01J 20/0244 |
| 2018/0345212 | A1* | 12/2018 | Legaspi Felipe | C10G 29/04 |
| 2021/0322920 | A1 | 10/2021 | Sahoo et al. | |
| 2025/0243399 | A1 | 7/2025 | Allred, Jr. | |

FOREIGN PATENT DOCUMENTS

| | | | |
|---|---|---|---|
| CN | 102585952 | A | 7/2012 |
| CN | 106795752 | B | 8/2020 |
| EP | 3566762 | A2 | 11/2019 |
| WO | 9408980 | A1 | 4/1994 |
| WO | 2016019101 | A1 | 2/2016 |
| WO | 2018009497 | A1 | 1/2018 |
| WO | 2020039199 | A1 | 2/2020 |
| WO | 2022178251 | A1 | 8/2022 |
| WO | 12022178286 | A1 | 8/2022 |

OTHER PUBLICATIONS

Faeze Tari et al., Modified and Systematic Synthesis of Zinc Oxidesilica Composite Nanoparticles With Optimum Surface Area as a Proper H2S Sorbent, Apr. 1, 2017, vol. 95, No. 4, Canadian Journal of Chemical Engineering, 7 pages.

Jan M. Bakke, et al. Hydrolysis of 1,3,5-Tris(2-hydroxyethyl)hexahydro-s-triazine and Its Reaction with H2S, Ind. Eng. Chem. Res., vol. 40, 2001, 3 pages.

Hydrogen Sulfide Scavenger (H2S Scavenger), Corrosionpedia, Last updated: Jul. 19, 2024, Retrieved from the Internet URL:https://www.corrosionpedia.com/definition/1645/hydrogen-sulfide-scavenger-h2s-scavenger.

L. Chu et al., Glycidoxypropyltrimethoxysilane Modified Colloidal Silica Coatings, Mrs Proceedings, Jan. 1, 1996, 5 pages, vol. 435, XP055524536.

L. Hoven et al., Odour Management Guidance for Refineries, Jan. 1, 2020, pp. 1-93, XP055851362.

Michael Gonser, et al., Simultaneous Control of Subsurface Scale, Corrosion, and H2S Using a Single Capillary String: A Real-World Chemical Application in the Permian Basin, 2022 SPE Annual Technical Conference and Exhibition, Oct. 5, 2022, 20 pages.

Mohamed Chehimi et al., Surface chemical and thermodynamic properties of [gamma]-glycidoxy-propyltrimethoxysilane-treated alumina: an XPS and IGC study, Journal of Materials Chemistry, Jan. 1, 2001, pp. 533-543, vol. 11, No. 2.

Zeina Abbas et al., Evaluation of CO2 Purification Requirements and the Selection of Processes for Impurities Deep Removal from the CO2 Product Stream, Energy Procedia, 2013, pp. 2389-2396, vol. 37.

Schaack and Chan, H2S Scavenging: Caustic-based process remains attractive, Oil & Gas Journal, vol. 87, No. 5, pp. 81-82, Jan. 1989.

Schaack and Chan, H2S Scavenging: Cost estimating depends on location material, Oil & Gas Journal, vol. 87, No. 9, pp. 90-91, Feb. 1989.

Schaack and Chan, H2S Scavenging: Formaldehyde-methanol, metallic-oxide agents head scavengers list, Oil & Gas Journal, vol. 87, No. 4, pp. 51-55, Jan. 1989.

Schaack and Chan, H2S Scavenging: Process design guidelines vary widely, Oil & Gas Journal, vol. 87, No. 8, pp. 45-48, Feb. 1989.

International Search Report for PCT/US2022/016952 mailed May 24, 2022, 5 pages.

Written Opinion of the ISA for PCT/US2022/016952 mailed May 24, 2022, 6 pages.

U.S. Appl. No. 18/546,674, filed Aug. 16, 2023, Southwell et al.

U.S. Appl. No. 18/546,664, filed Aug. 16, 2023, Maguire-Boyle et al.

U.S. Appl. No. 18/546,759, filed Aug. 16, 2023, Southwell et al.

U.S. Appl. No. 18/546,755, filed Aug. 16, 2023, Maguire-Boyle et al.

Vietnamese Office Action dated Jun. 23, 2025 in related Vietnamese Patent Application No. 1-2023-06320 and the response filed on Mar. 25, 2025, 7 pages.

Indonesian Substantive Examination Report Stage I issued Sep. 30, 2025 in related Indonesian Patent Application No. P00202309025, 5 pages.

Portela et al., "Spectroscopic evaluation of commercial H2S scavengers", Fuel 216 (2018) 681-685.

Vietnamese Notice of Allowance dated Jan. 5, 2026 in related Vietnamese Patent Application No. 1-2023-06320 and the allowed claims, 4 pages.

Response filed on Nov. 20, 2025 to the Indonesian Substantive Examination Report Stage I in related Indonesian Patent Application No. P00202309025, 10 pages.

* cited by examiner

USE OF TRANSITION METAL DOPED NANOPARTICLES AND SILICA NANOPARTICLES FOR $H_2S$ REMOVAL

CROSS-REFERENCE TO RELATED APPLICATIONS

This application is the US national phase of PCT/US2022/016952, filed Feb. 18, 2022, which claims the benefit of U.S. Application No. 63/151,245, filed Feb. 19, 2021, the entire contents of each of which are incorporated herein by reference.

FIELD OF THE INVENTION

This invention is in the field of chemicals used to remove hydrogen sulfide ($H_2S$) from Oil streams, Gas streams, $CO_2$ point source purification and Geothermal Energy Systems.

BACKGROUND OF THE INVENTION

Hydrogen sulfide is present in natural gas from many gas fields. It can also be present in Oil streams, Gas streams, $CO_2$ point source purification and Geothermal Energy Systems.

It is a highly undesirable constituent because it is toxic and corrosive and has a very foul odor. Therefore, several methods for its removal have been developed. These include adding triazines or glyoxals to the oil or gas streams. $H_2S$ removal strategies employing solid-supported oxides of transition metals such Copper, Zinc, Iron, Manganese, or Nickel are known and variously employed in the oil & gas industry, specifically in purification of natural gas. These strategies are known to have varying levels of success due to low efficiency and low removal capacities at ambient temperatures. Preparation of CuO nanoparticles for H2S treatment is known, preparation of nanoscale CuO being demonstrated by methods of sol-gel, precipitation, hydrothermal treatment, hydrolysis, and electrospinning. These approaches have demonstrated preparation of dry nanomaterials capable of scavenging H2S with good activity but are designed specifically to isolate dry particles, limiting the application method. Furthermore, preparation or pure CuO materials in practice would be economically undesirable due to the inherently high cost of metal oxide materials in comparison with the necessity to remove large amounts of $H_2S$ from a typical field application. The use of inexpensive colloidal silica as a template for metal oxide nanomaterials, in comparison, is a relatively inexpensive and efficient way to provide transition metal oxide in extremely high surface areas, as well as provide a convenient liquid form of method application desirable in the $H_2S$ scavenging market.

US 2005/084438, "Method for Reducing Odor Using Metal-Modified Silica Particles", issued as U.S. Pat. No. 7,438,875 B2 on Oct. 21, 2008. This patent describes and claims a method for reducing odor is provided. In one embodiment, the method comprises modifying the surface of silica particles with a transition metal so that the silica particles are bonded to the transition metal through a covalent or coordinate bond. The method further comprises contacting the modified silica particles with an odorous compound, the transition metal facilitating the capture of the odorous compound.

"Copper Coated Silica Nanoparticles for Odor Removal", Langmuir, American Chemical Society, US, vol. 26, no 2014 September 2010 (2010 Sep. 14) pages 15837-15844, XP002739110, describes work done on Copper species coated silica nanoparticle (CuOXS) were synthesized for odor removal application. Coating with copper increased the capacity of silica nanoparticles for eliminating a model odor-ethyl mercaptan. Surface area, pore size distribution, and electron paramagnetic resonance spectroscopy analyses indicated that, at lower copper concentrations, copper species preferentially adsorb in 20 Å pores of silica. These copper species in a dispersed state are effective in catalytic removal of ethyl mercaptans. The best performance of copper-coated silica nanoparticles was achieved at a copper concentration of 3 wt. %, at which all 20 Å nanopores were filled with isolated copper species. At higher copper loading, copper species are present as clusters on silica surfaces, which were found to be less effective in removing ethyl mercaptan.

Odour Management Guidance for Refineries, Hoven L., 1 Jan. 2020, pages 1-93, XP055851362, describes some of the main aspects relating to odour emissions at refineries that should be considered. These include methods of measuring and investigation odour, the key regulatory instruments, odour management and control methods, contents of an odour management plan (OMP) and implementation of an odour complaint handling system.

US 2005/085144 A1, "Durable charged particle coatings and materials" issued as U.S. Pat. No. 7,141,518 B2 on Nov. 28, 2006. This patent describes and claims coatings having high surface area materials and at least one metal ion adsorbed onto the high surface area material as well as substrates having the coating and methods of applying the coating. The substrates may be films, woven fabrics or may be nonwoven fabrics. The coatings have good odor and/or gas absorbing capabilities. Nonwoven fabrics include tissues, towels, coform materials, bonded carded webs, spunbond fabrics and so forth. The substrates may be made into storage and packaging material to reduce odor and retard the ripening of fruit. The substrates may be used in personal care products, to produce clothing for military and civilian applications and many other applications.

US 2013/204065 A1, "Protected Adsorbents for Mercury Removal and Method of Making and Using Same" issued as U.S. Pat. No. 9,006,508 B2 on Apr. 14, 2015. This patent describes and claims a method of removing mercury and/or sulfur from a fluid stream comprising contacting the fluid stream with a sorbent comprising a core and a porous shell formed to include a plurality of pores extending therethrough and communicating with the core. The core comprises a copper compound selected from the group consisting of a basic copper oxysalt, a copper oxide, and a copper sulfide.

US 2018/291284 A1 "Microparticles For Capturing Mercaptans" published on Oct. 11, 2018, and is assigned to Ecolab. This now abandoned patent application describes and claims scavenging and antifouling nanoparticle compositions useful in applications relating to the production, transportation, storage, and separation of crude oil and natural gas, as well as oral hygiene. Also disclosed are methods of making the nanoparticle compositions as scavengers and antifoulants, particularly in applications relating to the production, transportation, storage, and separation of crude oil and natural gas, as well as oral hygiene.

U.S. Pat. No. 5,980,845 "Regeneration of Hydrogen Sulfide Scavengers", issued on Nov. 9, 1999. This issued US patent describes and claims sulfide scavenger solutions and processes that have high sulfide scavenging capacity, provide a reduction or elimination of solids formation and avoid the use of chemicals that pose environmental concerns. The invention utilizes a dialdehyde, preferably ethanedial, for the purpose of reacting with amines, amine carbonates, or other derivatives of amines that are liberated when certain scavenger solutions react with sulfides, including hydrogen sulfide and mercaptans. The scavenger solutions that have been discovered to liberate amines are those formed by a reaction between an amine and an aldehyde.

SUMMARY OF THE INVENTION

The first aspect of the instant claimed invention is a process to remove $H_2S$ from a stream comprising the steps of (A) adding a fluid comprising (i) a dispersion of colloidal nanoparticles having surface functionality comprising Copper, Zinc, Iron, or Manganese, and (ii) a triazine wherein the stream is selected from the group consisting of Oil streams, Gas streams, $CO_2$ point source purification streams and Geothermal Energy System streams.

The second aspect of the instant claimed invention is a process to remove $H_2S$ from a stream comprising the step of (A) adding a fluid comprising a (i) colloidal dispersion of CuOXS nanoparticles; and, (ii) a triazine, wherein the stream is selected from the group consisting of Oil streams, Gas streams, $CO_2$ point source purification streams and Geothermal Energy System streams.

DETAILED DESCRIPTION OF THE INVENTION

Convenient and economical methods include the use of colloidal silicon dioxide particles as a template for transition metal oxide or halide surfaces. Copper, Iron, and Manganese metallic centers are known to efficiently react with $H_2S$ forming insoluble Sulfides. Copper, Zinc, Iron, or Manganese centers bound to silica nanoparticles, having reacted with $H_2S$ to form the corresponding Sulfide, can then be conveniently removed from the oil or gas stream.

A dispersion of CuOXS, which is a dispersion of colloidal silica surface treated with a combination of CuO and $CuCl_2$ is commercially available from Nissan Chemical America Corporation of Houston, Texas.

For purposes of this patent application, silica nanoparticles include silica nanoparticles, alumina nanoparticles and silica-alumina nanoparticles.

The silica nanoparticles are sourced from all forms of precipitated $SiO_2$ a) dry silica;

b) fumed silica;

c) colloidal silica;

d) surface treated silicas including silicas reacted with organosilanes;

e) metal or metal-oxide with silica combinations; and f) precipitated silica.

There are known ways to modify the surface of colloidal silica:

1. Covalent attachment of Inorganic oxides other than silica.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal silica.
   c. Silanization followed by post-reaction formation of oligomeric/dendritic/hyperbranched/polymeric species starting from colloidal silica surface.
   d. Formation of oligomeric/dendritic/hyperbranched/polymeric silanes/zirconates/titanates followed by reaction to $SiO_2$ surface.

The silica particles included in the colloidal silica may have any suitable average diameter. As used herein, the average diameter of silica particles refers to the average largest cross-sectional dimension of the silica particle. In an embodiment, the silica particles may have an average diameter of between about 0.1 nm and about 100 nm. In an embodiment, the silica particles may have an average diameter of between about 1 nm and about 100 nm. In an embodiment, the silica particles may have an average diameter of between about 5 nm and about 100 nm. In an embodiment, the silica particles may have an average diameter of between about 1 nm and about 50 nm. In an embodiment, the silica particles may have an average diameter of between about 5 nm and about 50 nm. In an embodiment, the silica particles may have an average diameter of between about 1 nm and about 40 nm. In an embodiment, the silica particles may have an average diameter of between about 5 nm and about 40 nm. In an embodiment, the silica particles may have an average diameter of between about 1 nm and about 30 nm. In an embodiment, the silica particles may have an average diameter of between about 5 nm and about 30 nm. In an embodiment, the silica particles may have an average diameter of between about 7 nm and about 20 nm.

In an embodiment, the silica particles have an average diameter of less than or equal to about 30 nm. In another embodiment, the silica particles may have an average diameter of less than or equal to about 25 nm. In another embodiment, the silica particles may have an average diameter of less than or equal to about 20 nm. In another embodiment, the silica particles may have an average diameter of less than or equal to about 15 nm. In another embodiment, the silica particles may have an average diameter of less than or equal to about 10 nm. In another embodiment, the silica particles may have an average diameter of less than or equal to about 7 nm. In another embodiment, the silica particles may have an average diameter of at least about 5 nm. In another embodiment, the silica particles may have an average diameter of at least about 7 nm. In another embodiment, the silica particles may have an average diameter of at least about 10 nm. In another embodiment, the silica particles may have an average diameter of at least about 15 nm. In another embodiment, the silica particles may have an average diameter of at least about 20 nm. In another embodiment, the silica particles may have an average diameter of at least about 25 nm. Combinations of the above-referenced ranges are also possible.

Colloidal silica is a flexible technology medium, allowing for customized surface treatment based on application. In an embodiment, the silica is a GlycidoxyPropylTriMethoxySilane-functional silica. GPTMS-functionalized silica includes alkaline sol silica, available from Nissan Chemical America as ST-V3. Another GPTMS-functionalized silica is an acidic type of silica sol, available from Nissan Chemical America as ST-OV3.

The amount of silica nanoparticle used per unit of H2S is as follows:

In an embodiment, 1 unit of silica nanoparticle per 3 units of H2S, in another embodiment, 1 unit of silica nanoparticle per 5 units of H2S and in another embodiment, 1 unit of silica nanoparticle per 10 units of H2S.

The alumina nanoparticles are sourced from all forms of precipitated $Al_2O_3$ a) dry alumina;

b) fumed alumina;

c) colloidal alumina;

d) surface treated aluminas including aluminas reacted with organosilanes;

e) metal or metal-oxide with alumina combinations; and f) precipitated alumina.

There are known ways to modify the surface of colloidal alumina:

1. Covalent attachment of Inorganic oxides other than alumina.
2. Non-covalent attachment of small molecule, oligomeric, or polymeric organic materials (PEG treatment, amines or polyamines, sulfides, etc.).
3. Covalent attachment of organic molecule including oligomeric and polymeric species:
   a. Reaction with organosilanes/titanates/zirconates/germinates.
   b. Formation of organosilanes/titanate/zirconate/germinate oligomers followed by reaction of these with surface of colloidal alumina.
   c. Silanization followed by post-reaction formation of oligomeric/dendritic/hyperbranched/polymeric species starting from colloidal alumina surface.
   d. Formation of oligomeric/dendritic/hyperbranched/polymeric silanes/zirconates/titanates followed by reaction to $Al_2O_3$ surface.

The alumina particles included in the colloidal alumina may have any suitable average diameter. As used herein, the average diameter of alumina particles refers to the average largest cross-sectional dimension of the alumina particle. In an embodiment, the alumina particles may have an average diameter of between about 0.1 nm and about 100 nm. In another embodiment, the alumina particles may have an average diameter of between about 1 nm and about 100 nm. In another embodiment, the alumina particles may have an average diameter of between about 5 nm and about 100 nm. In another embodiment, the alumina particles may have an average diameter of between about 1 nm and about 50 nm. In another embodiment, the alumina particles may have an average diameter of between about 5 nm and about 50 nm. In another embodiment, the alumina particles may have an average diameter of between about 1 nm and about 40 nm. In another embodiment, the alumina particles may have an average diameter of between about 5 nm and about 40 nm. In another embodiment, the alumina particles may have an average diameter of between about 1 nm and about 30 nm. In another embodiment, the alumina particles may have an average diameter of between about 5 nm and about 30 nm. In another embodiment, the alumina particles may have an average diameter of between about 7 nm and about 20 nm.

In an embodiment, the alumina particles have an average diameter of less than or equal to about 30 nm. In an embodiment, the alumina particles have an average diameter of less than or equal to about 25 nm. In an embodiment, the alumina particles have an average diameter of less than or equal to about 20 nm. In an embodiment, the alumina particles have an average diameter of less than or equal to about 15 nm. In an embodiment, the alumina particles have an average diameter of less than or equal to about 10 nm. In an embodiment, the alumina particles have an average diameter of less than or equal to about 7 nm. In an embodiment, the alumina particles have an average diameter of at least about 5 nm. In an embodiment, the alumina particles have an average diameter of at least about 7 nm. In an embodiment, the alumina particles have an average diameter of at least about 10 nm. In an embodiment, the alumina particles have an average diameter of at least about 15 nm. In an embodiment, the alumina particles have an average diameter of at least about 20 nm. In an embodiment, the alumina particles have an average diameter of at least about 25 nm. Combinations of the above-referenced ranges are also possible.

Colloidal alumina is a flexible technology medium, allowing for customized surface treatment based on application. In an embodiment, the alumina is a GPTMS-functional alumina. GlycidoxyPropylTriMethoxySilane-functional alumina includes alkaline sol silica, available from Nissan Chemical America as AT-V6. Another GPTMS-functionalized alumina is an acidic type of silica sol, available from Nissan Chemical America as AT-OV6.

The amount of alumina nanoparticle used per unit of H2S is as follows: 1 unit of alumina nanoparticle per 3 units of H2S, in another embodiment, 1 unit of alumina nanoparticle per 5 units of H2S and in another embodiment, 1 unit of alumina nanoparticle per 10 units of H2S.

Some examples of nanoparticles can include particles of spherical shape, fused particles such as fused silica or alumina or particles grown in an autoclave to form a raspberry style morphology, or elongated silica particles. The particles being bare, or surface treated. When surface treated may be polar or non-polar.

The surface treatment is sufficient to allow the nanoparticle to be stable during transportation to the area where a $H_2S$ sorbent is required and for delivery. The stability achieved either by covalent, charge-charge, dipole-dipole, or charge-dipole interactions.

Triazines useful in the instant claimed invention include, but are not limited to, 1,2,3-triazine; 1,2,4-triazine and 1,3,5-triazine (aka s-triazine). Triazines useful in the instant claimed invention include Hexahydro-1,3,5-tris(hydroxyethyl)-s-triazine.

Triazines are alkaline and can cause carbonate scaling. Triazines are commercially available.

Triazines can be present in the process at a level of from about zero point 1 (0.1) units to about 1 unit per 3 units of H2S. Units could mean any quantitative measure, such as grams, pounds, mols, etc. etc.

$CO_2$ Point Source Purification is described in "Evaluation of $CO_2$ Purification Requirements and the Selection of Processes for Impurities Deep Removal from the $CO_2$ Product Stream", Zeina Abbas et al, *Energy Procedia, Volume* 37, 2013, Pages 2389-2396. Depending on the reference power plant, the type of fuel and the capture method used, the $CO_2$ product stream contains several impurities which may have a negative impact on pipeline transportation, geological storage and/or Enhanced Oil Recovery (EOR) applications. All negative impacts require setting stringent quality standards for each application and purifying the $CO_2$ stream prior to exposing it to any of these applications.

In the Abbas paper, the $CO_2$ stream specifications and impurities from the conventional post-combustion capture technology are assessed. Furthermore, the $CO_2$ restricted purification requirements for pipeline transportation, EOR and geological storage are evaluated. Upon the comparison of the levels of impurities present in the $CO_2$ stream and their restricted targets, it was found that the two major impurities which entail deep removal, due to operational concerns, are oxygen and water from 300 ppmv to 10 ppmv and 7.3% to 50 ppmv respectively. Moreover, a list of plausible technologies for oxygen and water removal is explored after which the selection of the most promising technologies is made. It was found that catalytic oxidation of hydrogen and refrigeration and condensation are the most promising technologies for oxygen and water removal respectively.

"Geothermal Energy System Streams" are described as follows:

- Hot water is pumped from deep underground through a well under high pressure.
- When the water reaches the surface, the pressure is dropped, which causes the water to turn into steam.
- The steam spins a turbine, which is connected to a generator that produces electricity.
- The steam cools off in a cooling tower and condenses back to water.

EXAMPLES

Materials

- Stepanquat 200 is a 78.5% actives solution of Hexahydro-1,3,5-tris(hydroxyethyl)-s-triazine available commercially from Stepan Corp.
- ST-O40, ST-30, ST-OV4, PGM-ST, ST-C, ST-V3, and MT-ST are commercially available colloidal silica products from Nissan Chemical America Corporation.
- Organosilanes, Propylene Glycol Monomethyl Ether solvent, $NaHCO_3$, $CuCl_2$—$H_2O$, and Glyoxal were procured from Sigma Aldrich Corp.

Synthesis Example 1

1000 mL Snowtex® ST-30 from Nissan Chemical America Corporation (Aqueous alkaline colloidal silica dispersion, 30 wt % $SiO_2$ solids, 10-15 median particle size) was placed into a 2000 mL 4 neck glass reactor assembled with addition funnel, thermometer, heating mantle connected to voltage regulator, and mixer with 2 inch diameter trifoil mixing blade. Mixing was activated at 150 rpm and silicasol was brought to 50° C. Into the addition funnel was weighed 49.98 g of Aminoethylaminocthylaminopropyl Trimethoxysilane (CAS #35141-30-1. Sigma-Aldrich). Addition funnel was assembled to reactor top and silane was slowly added to stirring silicasol at a drop rate of 2 drops per second. After all organosilane had been added to reaction the mixture was allowed to stir at 50° C. for a period of 3 hours. Finished surface-treated alkaline silica was poured off to a 2 L Nalgene bottle for storage and use.

Synthesis Example 2

1.4 L Snowtex® O-XS (Aqueous acidic colloidal silica dispersion, 10 wt % colloidal silica median particle size 5 nm) was transferred to a 4-neck reaction kettle. To this vessel were also added 9.6 L distilled water. Copper (II) Chloride dehydrate ($CuCl_2$—$H_2O$, Sigma Aldrich), 13.87 g were added to the reaction flask and allowed to dissolve at room temperature under light agitation. A stock solution ("Solution A") of $NaHCO_3$ (Sigma Aldrich ACS reagent grade, ≥99.7% was prepared (47.04 g $NaHCO_3$ dissolved in 12.6 L distilled water, 0.04 M final concentration). The stir rate in the reaction vessel was increased to 9500 rpm to achieve vigorous agitation. Solution A was added slowly 10-15 mL per minute to the reaction via addition funnel. After Solution A was added completely the reaction was allowed to stir at room temperature for 30 minutes and contents were removed for storage and use.

Synthesis Example 3

Snowtex® PGM-ST (Solvent borne dispersion of acidic colloidal silica, 30 wt % SiO2 median particle size 10-15 nm dispersed in Propylene Glycol Monomethyl ether), 450 g were placed into a 1000 mL 4-neck reaction flask. Similar to Synthesis Example 1 the reactor was assembled with mixer, thermometer, and heating mantle/voltage regulator. A 4.05 g portion of 3-Mercaptopropyl Trimethoxysilane (Sigma Aldrich) were added to an addition funnel and assembled to the reactor. PGM-ST was brought to 50° C. under mild agitation and Mercaptopropyl trimethoxysilane was added dropwise via addition funnel at 1 drop/second until addition was complete. Reaction was kept at 50° C. for a period of 3 hours, then the surface-treated silicasol was poured off to a Nalgene container for storage and use.

Example 1, Comparative

Into a 1000 mL Nalgene bottle were placed 300 g distilled $H_2O$, 300 g Propylene Glycol Monomethyl Ether ("PGM") solvent, and 300 g Stepanquat 200. Contents were mixed thoroughly by shaking container vigorously for 30 seconds.

Example 2

Into a 1000 mL Nalgene bottle were placed 300 g distilled $H_2O$, 300 g Propylene Glycol Monomethyl Ether solvent, and 300 g Synthesis Example 1 fluid. Contents were mixed thoroughly by shaking container vigorously for 30 seconds.

Example 3, Comparative

Into a 1000 mL Nalgene bottle were placed 700 g distilled $H_2O$, and 300 g Stepanquat 200. Contents were mixed thoroughly by shaking container vigorously for 30 seconds.

Example 4

Into a 1000 mL Nalgene bottle were placed 300 g distilled $H_2O$, 300 g ST-O40 (Aqueous acidic colloidal silica available from Nissan Chemical America Corporation), and 300 g Stepanquat 200. Contents were mixed thoroughly by shaking container vigorously for 30 seconds.

Example 5

Into a 1000 mL Nalgene bottle were placed 300 g distilled $H_2O$, 300 g Synthesis Example 2 fluid, and 300 g Stepanquat 200. Contents were mixed thoroughly by shaking container vigorously for 30 seconds.

Example 6

Into a 1000 mL Nalgene bottle were placed 300 g distilled $H_2O$, 300 g ST-OV4 (Aqueous acidic hydrophilic surface treated colloidal silica available from Nissan Chemical America Corporation), and 300 g Stepanquat 200. Contents were mixed thoroughly by shaking container vigorously for 30 seconds.

Example 7

Into a 1000 mL Nalgene bottle were placed 300 g distilled $H_2O$, 300 g Synthesis Example 3 fluid, and 300 g Stepanquat 200. Contents were mixed thoroughly by shaking container vigorously for 30 seconds.

Example 8

Into a 1000 mL Nalgene bottle were placed 375 g aqueous solution of Glyoxal (Sigma Aldrich, 37.5 wt %) and 625 g ST-C (Aqueous alkaline colloidal silica dispersion partially surface treated with Aluminum Oxide available from Nissan Chemical America Corporation). Contents were mixed thoroughly by shaking container vigorously for 30 seconds.

Example 9

Into a 1000 mL Nalgene bottle were placed 375 g aqueous solution of Glyoxal (Sigma Aldrich, 37.5 wt %) and 625 g ST-O40 (Aqueous acidic colloidal silica dispersion available from Nissan Chemical America Corporation). Contents were mixed thoroughly by shaking container vigorously for 30 seconds.

Example 10

Into a 1000 mL Nalgene bottle were placed 375 g aqueous solution of Glyoxal (Sigma Aldrich, 37.5 wt %) and 625 g ST-V3 (Aqueous alkaline hydrophilic surface treated colloidal silica dispersion available from Nissan Chemical America Corporation). Contents were mixed thoroughly by shaking container vigorously for 30 seconds.

Example 11

Into a 1000 mL Nalgene bottle were placed 375 g aqueous solution of Glyoxal (Sigma Aldrich, 37.5 wt %) and 625 g MT-ST (Solvent borne acidic colloidal silica dispersed in Methanol, 30 wt % SiO2, 10-15 nm median particle size, available from Nissan Chemical America Corporation). Contents were mixed thoroughly by shaking container vigorously for 30 seconds.

Example 12: Comparative

Into a 1000 mL Nalgene bottle were placed 375 g aqueous solution of Glyoxal (Sigma Aldrich, 37.5 wt %) and 625 g distilled $H_2O$. Contents were mixed thoroughly by shaking container vigorously for 30 seconds.

MEA Triazine was kept at a constant concentration across all the Inventive and Comparative examples. Similarly, Glyoxal concentration was kept constant across all Inventive and Comparative examples.

Testing for Removal of H2S

Each solution tested was equilibrated for weight at 300 g total solution and placed into a vessel with overhead port to measure $H_2S$ content in the vessel headspace. The headspace port was connected to a Dräger Pac® 3500 gas monitor (Drägerwerk AG&Co. KGaA). A mixed gas of 10% $H_2S$/90% Nitrogen was bubbled through the test solution at a standard rate of 475 mL/minute, solution held at 22° C., and headspace monitored for $H_2S$ content. A reading of 0 means the sensor is not detecting any $H_2S$ in the flow gas stream after the gas has passed through the tested solution. Vessel headspace was monitored for $H_2S$ content once per minute continuously until a $H_2S$ content of 40 reading on gas monitor was reached, at which point the test example in solution reacting with $H_2S$ was considered to be consumed and the experiment stopped. Times to initial $H_2S$ reading and Time to complete $H_2S$ breakthrough were recorded and compared to controls/comparative examples.

Summary of Results

The Number of minutes is listed is how long the detector detected a value of "0" for H2S. The Table is ordered from best performance in terms of removal of H2S to worst performance.

| Example | Time to initial H2S reading (minutes) | Time to 40% H2S reading (minutes) | Composition | nanoparticle type |
|---|---|---|---|---|
| 2 | 124 | 160 | Triazine + Water + Amine func. SiO2 | Amine-Functional SiO2 |
| 1 | 117 | 145 | Triazine + Water + PGMsolvent (Comparative Example) | none |
| 8 | 107 | 184 | Glyoxal + ST-C | Aluminum oxide functional SiO2 |
| 4 | 71 | 164 | Triazine + Water + ST-O40 | Aqueous acidic SiO2 |
| 10 | 55 | 146 | Glyoxal + ST-V3 | Glycidoxy functional SiO2, alkaline |
| 5 | 55 | 139 | Triazine + Water + CuOXS | Transition Metal functional SiO2 |
| 7 | 55 | 105 | Triazine + Water + Mercapto functionalized PGM-ST | Mercapto Functional SiO2 |
| 9 | 51 | 86 | Glyoxal + ST-O40 | Aqueous acidic SiO2 |
| 3 | 44 | 61 | Triazine + Water (Comparative Example) | none |

-continued

| Example | Time to initial H2S reading (minutes) | Time to 40% H2S reading (minutes) | Composition | nanoparticle type |
|---|---|---|---|---|
| 6 | 39 | 153 | Triazine + Water + ST-OV4 | Glycidoxy functional SiO2, acidic |
| 12 | 8 | 14 | Glyoxal + Water (Comparative Example) | none |
| 11 | 1 | 2 | Glyoxal + MT-ST | Solventborne SiO2, acidic |

Observations about the Examples

1. Example 1: This is a Triazine controls/comparative examples with MEA Triazine dissolved in a mixture of water and PGM solvent. This example performed very well, much better than MEA Triazine alone at the same concentration dissolved in water. It is believed, without intending to be bound there bye, that it is possible PGM is actually very beneficial in Triazine+H2S reaction.
2. Example 2 (Amine-functional SiO2 combined with Triazine) performed very well compared to the comparative example, with improved/delayed time to initial H2S breakthrough and also time to final breakthrough (when the H2S readings reached a 40% level in the headspace above the sample).
3. Example 3 is the Triazine+water control, these times were used comparatively for all the Triazine+nanosilica examples. Example 3 exemplifies the standard field grade fluid of MEA Triazine fluid for treatment of sour gas.
4. Example 4 (ST-O40, Aqueous acidic silica+Triazine) performed the best of all Triazine+nanosilica examples. It is believed, without intending to be bound thereby, that the solid acidity of the acidic silica surface is likely acting as a catalyst to make the Triazine+H2S reaction more complete, leading to greatly improved/delayed time to initial and complete H2S breakthrough.
5. Example 5 (Copper functionalized nanosilica+Triazine) performed relatively well in improved/delayed time to initial and complete H2S breakthrough. This example is the only example of Transition Metal functional silica. (It is noted that the Aluminum present in Example 8 is not considered a true Transition metal, as it is a "Post Transition Metal".)
6. Example 6 (ST-OV4+Triazine) is aqueous acidic silica functionalized with hydrophilic organic surface treatment and is commercially available from Nissan Chemical America. This example had slightly worse time to H2S initial breakthrough, but had a greatly improved time to complete H2S breakthrough compared to the control (Example 3).
7. Example 7 (Mercapto-functional nanosilica dispersed in PGM+Triazine)—Slightly improved time to initial H2S breakthrough and much improved time to complete H2S breakthrough. It is believed, without intending to be bound thereby, that the Mercapto surface functionality can disrupt polymer formation in the Triazine+H2S reaction.
8. Example 8 is ST-C (Aqueous alkaline colloidal silica with Aluminum Oxide surface) combined with Glyoxal. Compared to Glyoxal alone this combination of ST-C+Glyoxal showed dramatic improvements in both time to initial and time to complete H2S breakthrough. The Glyoxal+nanosilica examples performed relatively well. It is noted that the Aluminum present in Ex. 8 is not considered a true Transition metal, as it is a "Post Transition Metal".
9. Example 9 (ST-O40+Glyoxal) performed much better than Glyoxal alone.
10. Example 10 (ST-V3, Aqueous alkaline silica with hydrophilic organic surface treatment+Glyoxal) performed very well compared to Glyoxal alone.
11. Example 11 (Acidic silica dispersed in Methanol) did not perform well, this example had the worst results of all. It is believed, without intending to be bound thereby that MT-ST completely deactivated Glyoxal from reacting with H2SJ
12. Example 12 is the solution of Glyoxal and water only, a comparative example with no added nanotechnology.

The invention claimed is:

1. A process to remove $H_2S$ from a stream comprising the step of (A) adding a fluid comprising
   (i) an aqueous dispersion of colloidal silica surface treated with a combination of CuO and $CuCl_3$; and,
   (ii) a triazine,
   wherein the stream is selected from the group consisting of Oil streams, Gas streams, $CO_2$ point source purification streams and Geothermal Energy System streams.

2. The process of claim 1, wherein the triazine is hexahydro-1,3,5-tris(hydroxyethyl)-s-triazine.

3. A process to remove $H_2S$ from a stream comprising the step of (A) adding a fluid consisting essentially of
   (i) an aqueous dispersion of colloidal silica surface treated with a combination of CuO and $CuCl_2$;
   (ii) water; and,
   (iii) a solution of hexahydro-1,3,5-tris(hydroxyethyl)-s-triazine, wherein the stream is selected from the group consisting of Oil streams, Gas streams, $CO_2$ point source purification streams and Geothermal Energy System streams.

4. A process to remove $H_2S$ from a stream comprising the step of (A) adding a fluid consisting of
   (i) an aqueous dispersion of colloidal silica surface treated with a combination of CuO and $CuCl_2$;
   (ii) water; and,
   (iii) a solution of hexahydro-1,3,5-tris(hydroxyethyl)-s-triazine, wherein the stream is selected from the group consisting of Oil streams, Gas streams, $CO_2$ point source purification streams and Geothermal Energy System streams.

* * * * *